US012044397B2

(12) United States Patent
Di Trapani et al.

(10) Patent No.: US 12,044,397 B2
(45) Date of Patent: Jul. 23, 2024

(54) LIGHTING DEVICE TO SIMULATE NATURAL LIGHT

(71) Applicant: CoeLux S.r.l., Lomazzo (IT)

(72) Inventors: Paolo Di Trapani, Cavallasca (IT); Paolo Ragazzi, Gorgonzola (IT); Davide Farina, Lomazzo (IT); Antonio Lotti, Arcisate (IT); Wilfried Pohl, Lomazzo (IT); Andreas Danler, Lomazzo (IT); Wilfried Kurz, Lomazzo (IT); Manfred Gstrein, Lomazzo (IT)

(73) Assignee: CoeLux S.r.l., Lomazzo (IT)

(*) Notice: Subject to any disclaimer, the term of this patent is extended or adjusted under 35 U.S.C. 154(b) by 0 days.

(21) Appl. No.: 18/016,988

(22) PCT Filed: Jul. 19, 2021

(86) PCT No.: PCT/IB2021/056498
§ 371 (c)(1),
(2) Date: Nov. 17, 2023

(87) PCT Pub. No.: WO2022/023868
PCT Pub. Date: Feb. 3, 2022

(65) Prior Publication Data

US 2023/0341107 A1 Oct. 26, 2023

(30) Foreign Application Priority Data

Jul. 29, 2020 (IT) ........................ 102020000018418

(51) Int. Cl.
*F21V 9/02* (2018.01)
*F21V 5/04* (2006.01)
(Continued)

(52) U.S. Cl.
CPC .................. *F21V 9/02* (2013.01); *F21V 5/04* (2013.01); *F21V 7/0091* (2013.01); *F21V 7/28* (2018.02); *F21V 9/20* (2018.02)

(58) Field of Classification Search
CPC ............ F21V 9/02; F21V 5/04; F21V 7/0091; F21V 9/20
See application file for complete search history.

(56) References Cited

U.S. PATENT DOCUMENTS 9,709,245 B2 * 7/2017 Di Trapani ............... F21V 9/02
2017/0153021 A1 * 6/2017 Di Trapani ........... F24F 13/078
(Continued)

FOREIGN PATENT DOCUMENTS

CN 109027798 B 12/2018
IT 2020000008113 A1 10/2021
(Continued)

OTHER PUBLICATIONS

Eric Prevot, European International Searching Authority, International Search Report and Written Opinion, counterpart PCT Application No. PCT/IB2021/056498, dated Jan. 10, 2022, 11 total pages.

*Primary Examiner* — Tracie Y Green
*Assistant Examiner* — Michael Chiang
(74) *Attorney, Agent, or Firm* — DiBerardino McGovern IP Group LLC

(57) ABSTRACT

A lighting device includes: a first optical unit and a second optical unit. The first optical unit includes a primary light source and dichroic separation optics. The primary light source is configured to emit primary light in the visible spectrum. The dichroic separation optics are configured to intercept at least part of the primary light generated by the primary light source and emit, from a first emission surface, at least one first highly collimated light component and at least one diffuse light component. The at least one first highly collimated light component and the at least one
(Continued)

diffuse light component forms a light with chromatic components having different angular distributions. The second optical unit includes secondary collimation optics is configured to generate, from the light with chromatic component, a weakly collimated light component and a second highly collimated light component.

21 Claims, 8 Drawing Sheets

(51) Int. Cl.

| | |
|---|---|
| ***F21V 7/00*** | (2006.01) |
| ***F21V 7/28*** | (2018.01) |
| ***F21V 9/20*** | (2018.01) |

(56) References Cited

U.S. PATENT DOCUMENTS

| | | | | |
|---|---|---|---|---|
| 2018/0246270 | A1* | 8/2018 | Di Trapani | F21S 8/006 |
| 2019/0024874 | A1* | 1/2019 | Van Bommel | G02B 5/208 |

FOREIGN PATENT DOCUMENTS

| | | | |
|---|---|---|---|
| WO | 2009156347 | A1 | 12/2009 |
| WO | 2009156348 | A1 | 12/2009 |
| WO | 2012140579 | A1 | 10/2012 |
| WO | 2014075721 | A1 | 5/2014 |
| WO | 2014076656 | A1 | 5/2014 |
| WO | 2015135560 | A1 | 9/2015 |
| WO | 2017084756 | A1 | 5/2017 |
| WO | 2018091150 | A1 | 5/2018 |
| WO | 2021209964 | A1 | 10/2021 |

* cited by examiner

LIGHTING DEVICE TO SIMULATE NATURAL LIGHT

TECHNICAL FIELD

The present invention relates in general terms to a lighting device to simulate natural lighting, specifically to simulate the light of the sky and the sun, thus capable of generating at least two light components with different angular distributions and having different correlated colour temperature or CCT. In particular, the present invention relates to a lighting device capable of generating a first highly collimated light component having a lower CCT than the CCT of a second weakly collimated light component, i.e. having an angular aperture of the intensity profile greater than the angular aperture of the highly collimated light component.

BACKGROUND

State-of-the-art lighting systems are known to simulate natural lighting, specifically the light of the sky and the sun, capable of generating light with chromatic components having different angular distributions, with a first component of directional light, or direct light, having a first correlated colour temperature or lower CCT, and a second diffuse light component having a second greater CCT.

Exemplary embodiments of such lighting systems may use, for example, Rayleigh-type diffusion layers as described in various patent applications of the same Applicant such as WO 2009/156347 A1, WO 2009/156348 A1, WO 2014/076656 A1, and WO 2017/0847561 A1 filed by the same Applicant. Known lighting systems mostly use a light source that produces visible light, and a panel containing nanoparticles. The panel is illuminated by the light source and acts as a so-called chromatic diffuser or Rayleigh-like diffuser, i.e. it diffuses the incident light in a manner similar to the earth's atmosphere under clear sky conditions, thus separating the incident light into a first component of direct light that crosses the panel substantially without being diffused and a second component of light diffused by the panel. In particular, the diffuse light component has a greater CCT than the direct light component, as the Rayleigh-like diffuser has a scattering efficiency that is a function of the wavelength of the light and is greater for shorter wavelengths.

Thanks to the interaction between the direct component with lower CCT that illuminates the objects and projects the shadows thereof, and the diffuse light with higher CCT, which gives the shadows a bluish colouring, the lighting systems are able to faithfully recreate the solar lighting, thus giving the environment a perception of large space.

However, this effect is strongly mitigated when the known lighting systems simulating natural lighting are used in an environment in combination with secondary lighting devices generating traditional white light. The addition of secondary lighting devices is usually aimed at achieving a degree of illumination higher than that provided by the natural lighting system alone, keeping the overall costs for lighting the environment contained.

In such circumstances, the effect of spatial expansion offered by the lighting system simulating natural light is in fact no longer perceptible, since the secondary lighting of the traditional type is not able to generate the contrasts in intensity and colour that are typical of natural light.

The Applicant has therefore observed that, in order not to alter the perception offered by the lighting systems simulating natural light, it is convenient to use secondary lighting devices which are also capable of generating light with chromatic components having different angular distributions with chromatic characteristics and angular aperture of the intensity profile that are comparable to the light components generated by the lighting system simulating natural lighting.

The Applicant has therefore set itself the goal of designing a lighting device to simulate natural lighting that can be used as a secondary lighting device in combination with lighting systems that simulate natural lighting.

In particular, the Applicant has set itself the objective of realising a lighting device to simulate natural lighting that allows to increase the overall lighting offered by a lighting system that simulates natural lighting without altering the perception offered, and that can be realised at a reasonable cost.

Furthermore, the Applicant has set itself the objective of devising a lighting device to simulate natural lighting that can be used to realise a localised natural lighting, for example to illuminate a limited area, such as a work surface, a desk, a table and so on.

In particular, the Applicant wished to study a lighting device to simulate the natural lighting that is able to reproduce the natural lighting without presenting glare effects or unnatural colourings of the ceiling of the room in which it is installed, while offering high lighting efficiency.

SUMMARY OF THE INVENTION

In a first aspect, the present invention is directed to a lighting device to simulate natural lighting comprising a first optical unit in turn comprising a primary light source configured to emit primary light in the visible spectrum, and dichroic separation optics configured to intercept at least part of the primary light generated by the primary light source and emit, from a first emission surface, at least one first highly collimated light component having a propagation direction, generated starting from the primary light, and at least one diffuse light component. The at least one first highly collimated light component and the at least one diffuse light component form a light with chromatic components having different angular distributions.

Further, the at least one first highly collimated light component has a first correlated colour temperature $CCT_1$, a total flux and a luminous intensity profile characterized by a first angular aperture $\alpha$ which is lower than 30° measured as half width at half maximum (HWHM) with reference to at least one half-plane section of the dichroic separation optics containing the propagation direction.

Again, the at least one diffuse light component has a second correlated colour temperature $CCT_2$ higher than the first correlated colour temperature $CCT_1$ and a non-zero luminous intensity profile even for angles higher than 2 times the first angular aperture $\alpha$, such as substantially Lambertian luminous intensity profiles.

A substantially Lambertian emission profile is understood to mean an emission profile proportional to the cosine of the emission angle, with emission angle equal to 0° for the normal direction to the emission surface.

According to the present invention, there is also provided a second optical unit comprising secondary collimation optics configured to intercept at least part of the light with chromatic components having different angular distributions emitted by the first emission surface and generate, starting from this light with chromatic components having different angular distributions,

- a weakly collimated light component having a luminous intensity profile, referred to the half-plane section, characterized by an average value, calculated with reference to an attenuation angular range comprised between an attenuation angle γ and 90°, which is less than the average value of the luminous intensity profile of the at least one component of diffuse light, calculated with respect to the same attenuation angular range, the attenuation angle γ being measured with respect to the propagation direction and being equal to at least 2 times the first angular aperture α of the luminous intensity profile of the first highly collimated light component emitted by the first emission surface, and a second highly collimated light component having substantially the same total flux as the first highly collimated light component and a second luminous intensity profile angular aperture α' which is less or equal to the first luminous intensity profile angular aperture α of the first highly collimated light component emitted by the first emission surface; and wherein the weakly collimated light component and the second highly collimated light component form a collimated light with chromatic components having different angular distributions emitted by the second optical unit.

The lighting device to simulate natural lighting thus conceived is able to generate a light with two chromatic components having different angular distributions, however effectively preventing the light at a higher colour temperature (bluish light) from generating glare effects or from giving the environment an unnatural colouring that the natural light of the sky and the sun would not produce. At the same time, the lighting efficiency is substantially maintained unaltered.

In this way, the lighting device according to the invention can be validly used both as a secondary lighting device, to support lighting systems to simulate natural lighting, since the generation of the chromatic components with different angular distributions allows to support the natural lighting effects that these systems reproduce, and as localized natural lighting, capable of providing a good lighting efficiency in the absence of glare effects.

In accordance with a second aspect thereof, the present invention is directed to a lighting system to simulate natural lighting comprising a plurality of lighting devices of the type described above arranged in such a way as to generate a plurality of highly collimated light components, each around a respective propagation direction of a plurality of parallel propagation directions, the lighting devices being arranged in an extended structure on a plane perpendicular to each of the propagation directions.

Advantageously, the lighting system thus configured makes it possible to achieve the same advantages as described with reference to the lighting device to simulate natural lighting according to the invention.

The present invention may have at least one of the following preferred features; the latter may in particular be combined with one another as desired in order to meet specific application needs.

Preferably, the at least one first highly collimated light component has a luminous intensity profile characterized by a first angular aperture α which is lower than 20°, more preferably lower than 15°, measured as half-width at half height (HWHM) with reference to the at least one half-plane section of the dichroic separation optics containing the propagation direction.

Preferably, the attenuation angle γ is equal to at least 2.5 times, more preferably equal to 3 times, the first angular aperture α of the luminous intensity profile of the first highly collimated light component emitted by the first emission surface.

In a variant of the invention, the secondary collimation optics are configured to generate a weakly collimated light component having a luminous intensity profile, referred to the half-plane section, characterized by an average value of less than 60%, preferably less than 40%, more preferably less than 20% of the average value of the luminous intensity profile of the at least one diffuse light component, calculated with reference to the attenuation angular range.

The secondary collimation optics are further preferably configured to substantially not intercept the highly collimated light component and/or not redistribute and/or not redirect the highly collimated light component outside of the first angular aperture α, in particular to intercept and/or redistribute and/or redirect outside the first angular aperture α less than 10% of the total flux of the highly collimated light component exiting the first emission surface 25, preferably less than 5%, more preferably less than 2%.

In a variant of the invention, the secondary collimation optics are embodied as a refractive lens configured so as to intercept and reflect at least part of the at least one diffuse light component and redistribute it so as to generate a weakly collimated light component having a luminous intensity profile, referred to the half-plane section, characterized by an average value which is lower than the average value of the luminous intensity profile of the at least one diffuse light component calculated with respect to the attenuation angular range.

Alternatively or additionally, the secondary collimation optics are embodied as a refractive lens configured so as to intercept and redirect at least part of the at least one diffuse light component and redistribute it so as to generate a weakly collimated light component having a luminous intensity profile, referred to the half-plane section, characterized by an average value which is lower than the average value of the luminous intensity profile of the at least one diffuse light component calculated with respect to the attenuation angular range.

Preferably, the refractive lens is configured to additionally intercept and redirect at least part of the first highly collimated light component in such a way as to generate a second highly collimated light component having a luminous intensity profile characterized by a second angular aperture α' measured as half width at half maximum (HWHM) with reference to the half-plane section which is lower than or equal to, preferably lower than, the first angular aperture α.

Alternatively or additionally, the secondary collimation optics are a structure comprising walls having at least a portion made of a material having a diffuse reflectance of at least 50%, preferably at least 55%, more preferably at least 60%.

Alternatively or additionally, the secondary collimation optics are a structure comprising walls having at least a portion made of a material having an absorption coefficient in the visible range equal to at least 70%, more preferably equal to at least 80%, even more preferably equal to at least 90% of the incident light and positioned so as to intercept and absorb at least part of the diffuse light component emitted by the first emission surface at angles greater than the attenuation angle γ.

In the context of this description and subsequent claims, the terms “absorption coefficient”, “regular reflectance” and “diffuse reflectance” refer to the definitions given in the standard E284 regarding the terminology describing the appearance of materials and light sources.

Preferably, the secondary collimation optics are configured to substantially not modify the correlated colour temperature CCT of the light components with chromatic components having different angular distributions emitted by the first optical unit.

Preferably, the secondary collimation optics are configured to generate, starting from the light with chromatic components having different angular distributions emitted by the first emission surface, a weakly collimated light component having a correlated colour temperature substantially equal to the second correlated colour temperature $CCT_2$ of the diffuse light component of the light emitted by the first emission surface, and a second highly collimated light component having a correlated colour temperature substantially equal to the first correlated colour temperature $CCT_1$ of the first highly collimated light component of the light emitted by the first emission surface.

In a variant of the invention, with reference to the half-plane section, the angular aperture $\beta$ of the weakly collimated light component measured as half width at half maximum (HWHM) of the luminous intensity profile is 1.2 times greater, preferably 1.5 times greater, more preferably 2 times greater than the first angular aperture $\alpha$ measured as half width at half maximum (HWHM) of the intensity profile of the first highly collimated light component.

In a variant of the invention, the dichroic separation optics comprise an optical element for primary collimation configured to generate the highly collimated light component having a luminous intensity profile with the first angular aperture $\alpha$ starting from the primary light, and a diffuse light generator configured to generate the diffuse light component with the second correlated colour temperature.

Preferably, the diffuse light generator is a chromatic scattering element configured to be transparent to at least a first spectral portion of a light incident on the same and to scatter at least a second spectral portion of the incident light.

Alternatively or additionally, the diffuse light generator is a chromatic scattering element of the tunable type, being configured to vary principally the scattering efficiency of the chromatic scattering element in at least the second spectral portion of the incident light, thereby tuning the scattering efficiency of the second spectral portion of the incident light.

Alternatively or additionally, the diffuse light generator is a chromatic scattering element of the tunable type comprising a matrix made of polymeric material in which nano-droplets containing liquid crystals are trapped.

Alternatively or additionally, the diffuse light generator is a chromatic scattering element shaped as a panel, a film, a surface coating layer or a surface anodizing layer.

Alternatively or additionally, the diffuse light generator is a diffuse light generator of the active type, capable of generating diffuse light independently of the primary light source, and made of a material substantially transparent to light, irrespective of the spectrum thereof.

More preferably, the chromatic scattering element is placed at the first emission surface or at least at one surface of interaction between said primary light and said primary collimation element.

In a variant of the invention, at least the optical element for primary collimation of the dichroic separation optics has axial symmetry and the propagation direction is comprised in a symmetry axis of the optical element for primary collimation; and the diffuse light generator has a circular or quadrilateral section—such as for example a square or rectangular—or polygonal section.

In an alternative variant of the invention, the optical element for primary collimation of the dichroic separation optics has an elongated conformation along a development axis of the device, transversal to the propagation axis.

In a variant of the invention, the first optical unit comprises a plurality of primary light sources, for example arranged side by side and/or aligned along the development axis, and wherein the dichroic separation optics comprise at least one collimation lens associated with the plurality of primary light sources and configured to collimate the light emitted by each of the primary light sources around a respective propagation direction of a plurality of parallel propagation directions.

BRIEF DESCRIPTION OF THE DRAWINGS

The accompanying drawings, which are incorporated herein and form part of the description, illustrate exemplary embodiments of the present invention and, together with the description, are intended to illustrate the principles of the present invention.

In the drawings.

DETAILED DESCRIPTION

Figure 1:
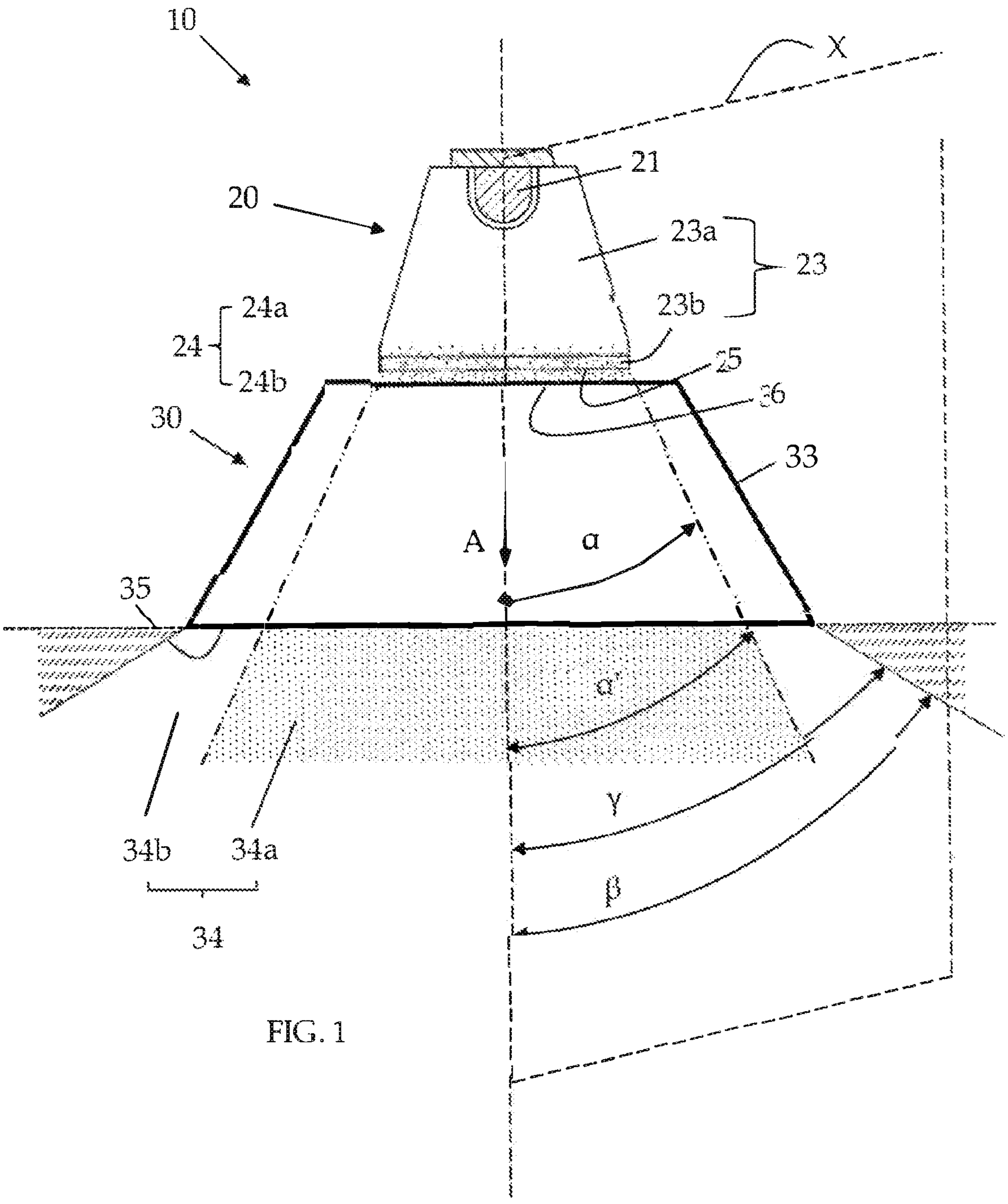
FIG. 1 is a schematic representation of a first embodiment of the lighting device to simulate natural lighting according to the present invention.

The following is a detailed description of exemplary embodiments of the present invention. The exemplary embodiments described herein and illustrated in the drawings are intended to teach the principles of the present invention, enabling the person skilled in the art to implement and use the invention in different contexts and/or for different applications. Therefore, the exemplary embodiments are not intended, nor should they be considered, to limit the scope of patent protection. Rather, the scope of patent protection is defined by the attached claims.

With reference to FIG. 1, there is schematically illustrated a lighting device to simulate natural lighting, hereinafter referred to as 'lighting device' for brevity's sake, according to a first embodiment of the present invention, collectively referred to as 10.

The lighting device 10 comprises a first optical unit 20 and a second optical unit 30 optically coupled to each other in such a way that the second optical unit 30 intercepts at least part of the light emitted by the first optical unit 20.

In detail, the first optical unit 20 comprises at least one primary light source 21 configured to emit a primary light 22 comprising at least one set of electromagnetic radiations having wavelengths comprised in the visible spectrum (i.e., 380 nm≤λ≤740 nm), also referred to by the terms 'light beam', 'light ray' or 'light' hereafter. For example, the primary light source 21 is a solid-state light-emitting device (LED).

The first optical unit 20 further comprises at least dichroic separation optics 23 having a first light-emitting surface 25 from which light 24 is emitted with chromatic components having different angular distributions. The primary light source 21 is positioned so as to substantially introduce the primary light 22 into the dichroic separation optics 23.

The dichroic separating optics 23 are configured to generate, starting from the primary light 22 emitted by the primary light source 21, at least a first highly collimated light component 24*a* that crosses the first emission surface 25 and propagates along a propagation direction A, with the propagation direction A coinciding with the direction along which the first highly collimated light component 24*a* exhibits its maximum luminous intensity, and a diffuse light component 24*b* that crosses the first emission surface 25 propagating in substantially all directions. For example, the diffuse light component 24*b* has a substantially Lambertian luminous intensity profile.

The first highly collimated light component 24*a* generated by the dichroic separation optics 23 is characterized by a luminous intensity profile—referred to at least one half-plane section X of the dichroic separation optics 23 containing the propagation direction A—having an angular aperture α—measured in terms of half width at half maximum (HWHM)—which is lower than 30°, preferably lower than 20°, more preferably lower than 15°. In addition, the first highly collimated light component 24*a* is characterized by a first correlated colour temperature or $CCT_1$ and by a total flux.

The dichroic separation optics 23 are further configured to generate the at least one diffuse light component 24*b* with a second correlated colour temperature or different $CCT_2$, in particular higher, than the correlated colour temperature $CCT_1$ of the first highly collimated light component 24*a*. Specifically, the first highly collimated light component 24*a* has a correlated colour temperature $CCT_1$ 1.2 times lower, preferably 1.3 times lower, more preferably 1.4 times lower than the correlated colour temperature $CCT_2$ of the diffuse light component 24*b*.

Figure 2:
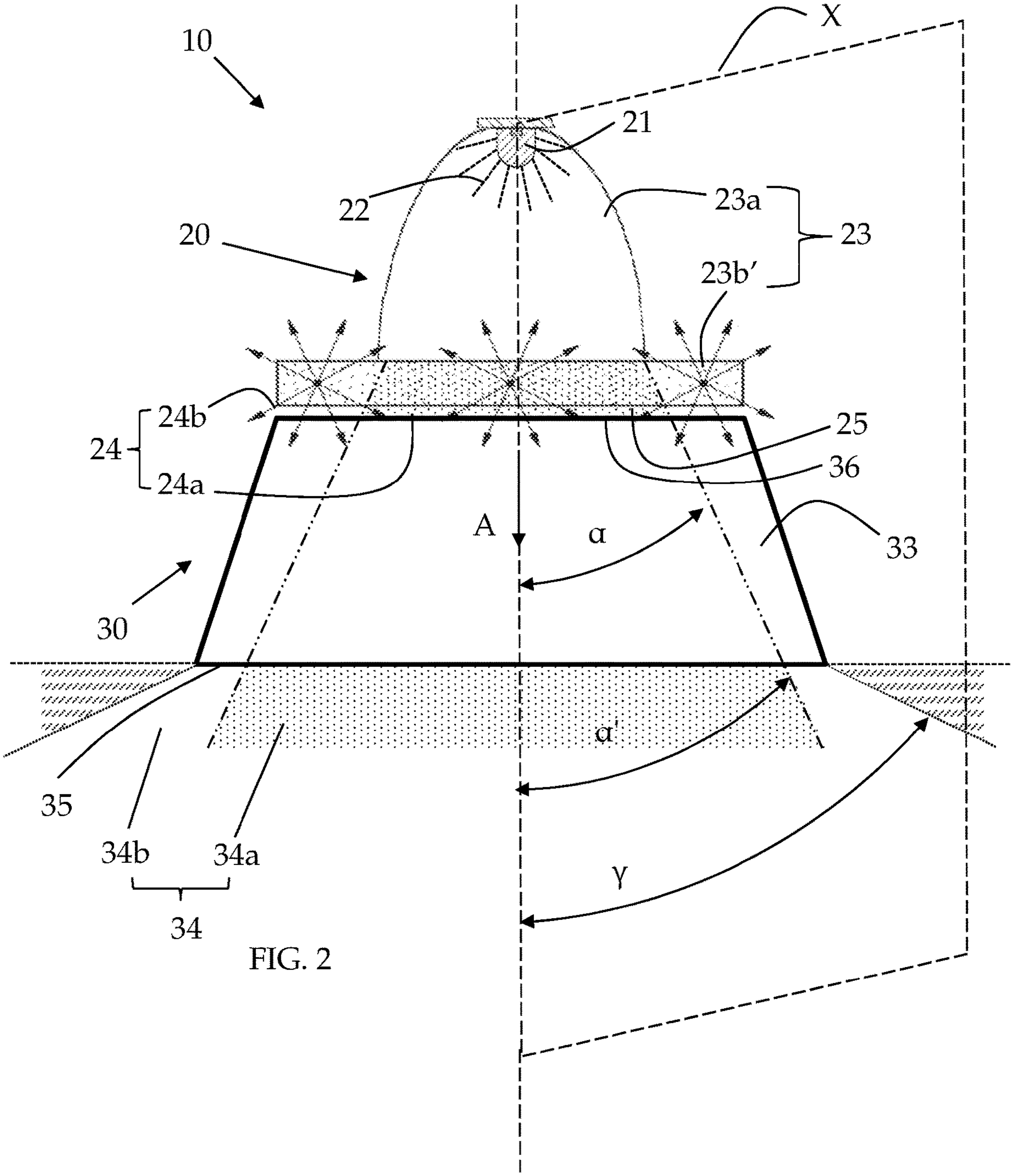
FIG. 2 is a schematic representation of a second embodiment of the lighting device to simulate natural lighting according to the present invention.

In exemplary terms, the dichroic separation optics 23 comprise an optical element for primary collimation 23*a*, for example a total internal reflection (TIR) lens as shown in FIG. 1 or a reflector as shown in FIG. 2, and a diffuse light generator 23*b*,23*b*',23*b*'', which in the embodiment of FIG. 1 is made as a chromatic scattering element 23*b*, placed at the first emission surface 25 and so as to intercept the collimated light exiting the optical element for primary collimation 23*a*. In particular, the optical element for primary collimation 23*a* of the embodiment of FIG. 1 has axial symmetry, thus resulting that the luminous intensity profile of the first highly collimated light component 24*a* is substantially equal with reference to a half-plane section X of the dichroic separation optics 23 containing the propagation direction A. The chromatic scattering element 23*b* may also be realized with axial symmetry, for example with circular section, or may have no axial symmetry having a quadrilateral section, such as for example a square or rectangular, or regular polygonal section or not.

"Chromatic diffusing element" means a diffuser element whose light-diffusing properties depend on the wavelength of the light crossing it, such as a Rayleigh diffuser or Rayleigh-like diffuser. This type of diffuser is characterized by being substantially transparent to, or having negligible interaction with, a first spectral portion of the light incident on the same.

The first spectral portion of the incident light therefore crosses the chromatic scattering element 23*b* substantially unaltered and—being collimated as a result of the action of the optical element for primary collimation 23*a*—generates, downstream of the chromatic scattering element 23*b*, the first highly collimated light component 24*a* of the light 24 with chromatic components having different angular distributions having the lower correlated colour temperature $CCT_1$, wherein "downstream" is understood with respect to the propagation direction A. On the contrary, the chromatic scattering element 23*b* acts mainly on a second spectral portion of the light incident on the same, scattering it significantly and thus giving rise to the diffuse light component 24*b* of the light 24 with chromatic components having different angular distributions which has a higher correlated colour temperature $CCT_2$, since it is substantially devoid of the wavelengths belonging to the first spectral portion.

Figure 5:
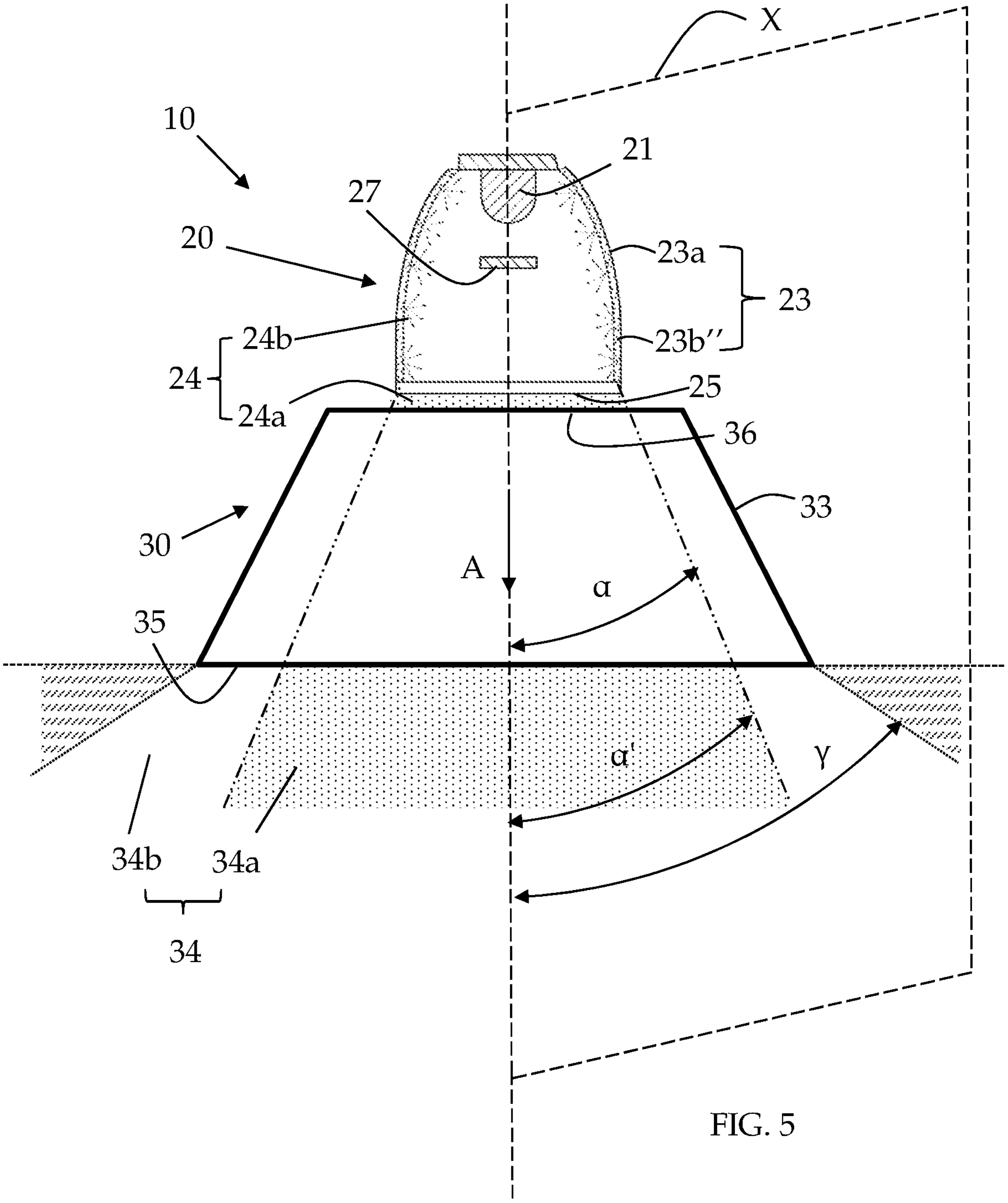
FIG. 5 is a schematic representation of a fifth embodiment of the lighting device to simulate natural lighting according to the present invention.

The chromatic separation and the generation of the diffuse light component 24*b* with higher $CCT_2$ (bluish light component) can be achieved by using a "thick" panel, as shown for example in FIG. 1, or a "thin" layer, illustrated in exemplary terms in FIG. 5—which is generally referred to herein as "chromatic scattering element 23*b*"—comprising a layer in a host material in which transparent nanometric scattering elements (also known as "scattering elements") are present in a predetermined amount per unit area and having a different refractive index with respect to the refractive index of the host material.

Such a chromatic scattering element may be in the form of a panel, a film, a surface coating layer or even a surface anodizing layer of a metal surface having specific structural characteristics described in detail in Italian patent application No. 102020000008113, filed by the same Applicant, the contents of which are herein fully referred to and incorporated by reference.

Again, the chromatic scattering element may be of the tunable type, whereby the intensity of interaction between the chromatic scattering element and the incident light may be tuned, thereby modifying the diffusion efficiency in particular of the second spectral portion of the incident light, i.e. the portion of the incident light on which the chromatic scattering element mainly acts. The chromatic diffusion elements of the tunable type comprise, for example, a matrix made of polymeric material (host material) in which so-called nanodrops containing liquid crystal (LC) molecules (diffusion nanometric elements) are trapped. The liquid crystals cause an anisotropy in the refractive index, which therefore makes it possible to tune the jump in the refractive index between the liquid crystal nanodroplets and the host material by varying an applied voltage. In general terms, the index variation is due to the fact that the liquid crystal molecules inside each nanodroplet tend to align when an electric field is applied, having a degree of alignment that can be modified according to the magnitude of the applied voltage. For further details, reference is made to International Patent Application No. WO 2018/091150 of the same Applicant and the contents of which are fully referred to and incorporated herein by reference.

Unlike the embodiment of FIG. 1, the embodiment shown in FIG. 2 comprises a diffuse light generator 23*b*' of the active type, i.e. capable of generating diffuse light 23*b*' independently of the primary light source 21, placed at the first emission surface 25. In particular, the diffuse light generator 23*b*' generates the diffuse light component 24*b* with higher correlated colour temperature $CCT_2$ than the light 24 with chromatic components having different angular distributions emitted by the first emission surface 25. In addition, the diffuse light generator 23*b*' is made of a material that is substantially transparent to light, independently of the spectrum thereof. In this way, almost all of the collimated light exiting the optical element for primary collimation 23*a* intercepted by the diffuse light generator 23*b*' propagates downstream of the same with respect to the propagation direction A, giving rise to the first highly collimated light component 24*a* of the light 24 with chromatic components having different angular distributions emitted by the first emission surface 25.

The second optical unit 30 comprises at least one secondary collimation optics 33 having a light-input surface 36, placed downstream of the first light-emitting surface 25 of the first optical unit 20 and such that it intercepts at least part of the light 24 with chromatic components having different angular distributions emitted by the first optical unit 20, and a second light-emitting surface 35 from which collimated light 34 with chromatic components having different angular distributions is emitted.

In particular, the secondary collimation optics 33 are configured to interact with the diffuse light component 24*b* of the light 24 emitted by the first optical unit 20 so as to generate, downstream of the second light-emitting surface 35, a weakly collimated light component 34*b* having a luminous intensity profile, referred to the at least one half-plane section X of the dichroic separation optics 23, characterized by an average value, calculated with reference to an attenuation angular range comprised between an attenuation angle γ and 90°, which is less than the average value of the luminous intensity profile of the at least one diffuse light component 24*b*, calculated with respect to the same attenuation angular range.

In detail, the attenuation angle γ is measured with respect to the propagation direction A and is equal to at least 2 times, preferably at least 2.5 times or, even more preferably, at least 3 times, the first angular aperture α of the luminous intensity profile of the first highly collimated light component 24*a* emitted by the first emission surface 25.

For example, the secondary collimation optics 33 are configured to generate a weakly collimated light component 34*b* having a luminous intensity profile referred to the half-plane section X characterized by an average value of less than 60%, preferably less than 40%, more preferably less than 20% of the average value of the luminous intensity profile of the diffuse light component 24*b* exiting the first emission surface 25, calculated in the attenuation angular range, i.e. the angular range comprised between the attenuation angle γ and 90°. This ensures that the lighting device 10 is characterized by a minimal glare for angles within the attenuation angular range, with reference to the at least one half-plane section X, while maintaining high luminous efficiency levels of the lighting device.

Figure 3:
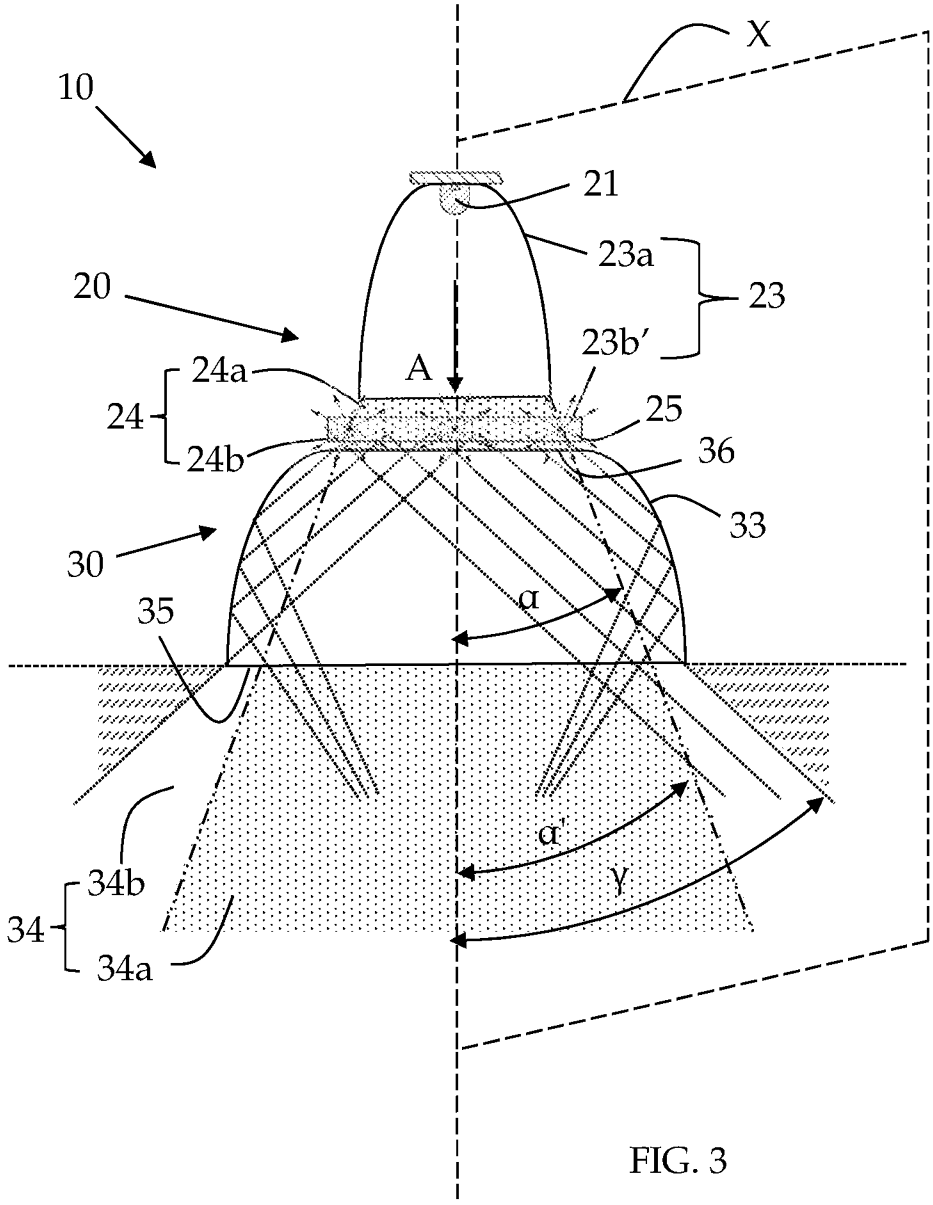
FIG. 3 is a schematic representation of a third embodiment of the lighting device to simulate natural lighting according to the present invention.
Figure 4:
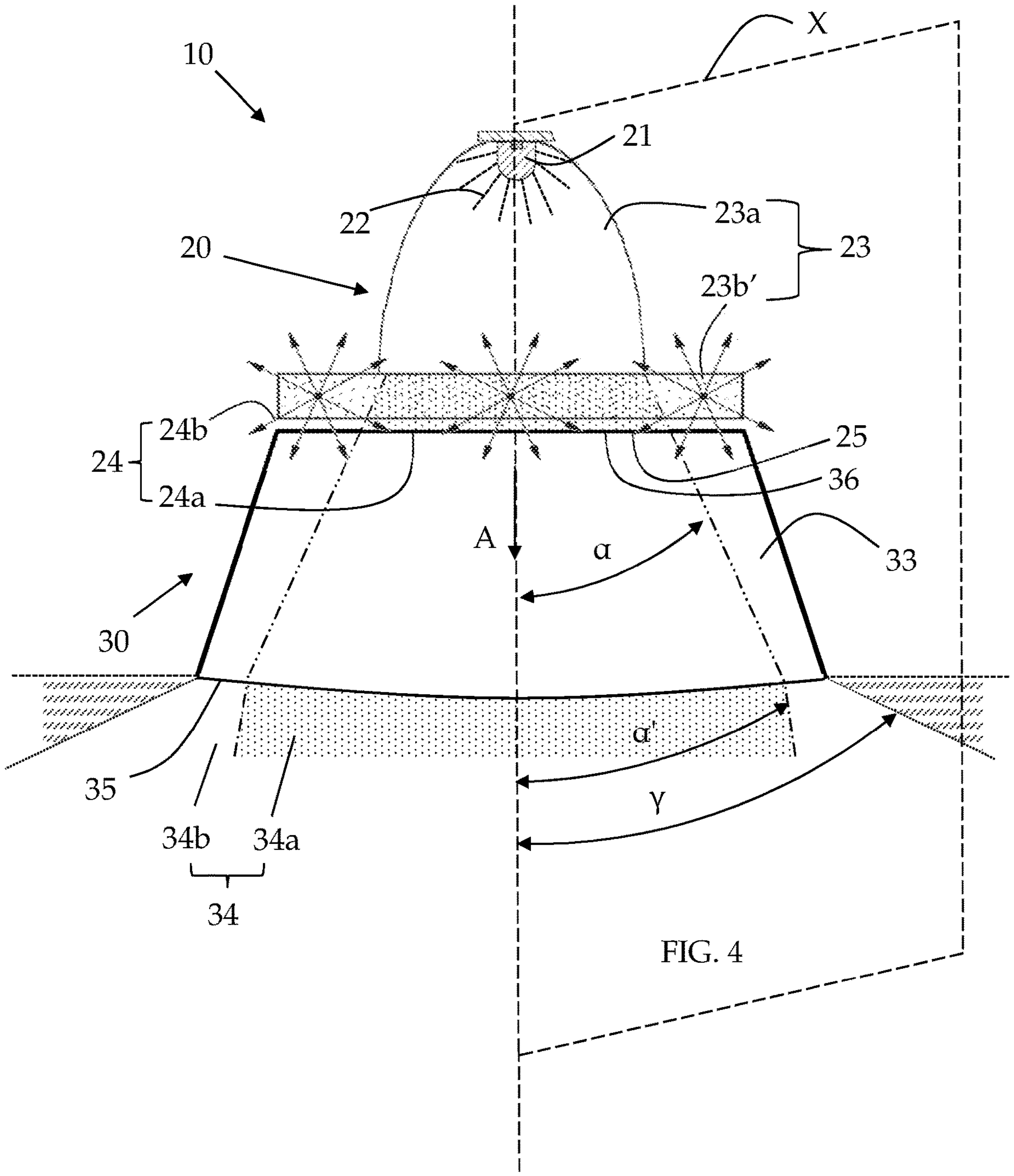
FIG. 4 is a schematic representation of a fourth embodiment of the lighting device to simulate natural lighting according to the present invention.

In addition, the secondary collimation optics 33 are configured to interact with the first highly collimated light component 24*a* of the light 24 emitted by the first emission surface 25 so as to generate a second highly collimated light component 34*a* having substantially the same total flux as the first highly collimated light component 24*a* and a second angular aperture α' of the luminous intensity profile which is equal or less than the first angular aperture α of the luminous intensity profile of the first highly collimated light component 24*a* emitted by the first emission surface 25, e.g., by not intercepting the first highly collimated light component 24*a*, as shown in FIG. 1-3, or by not redistributing it or by redirecting it outside its angular aperture α, as shown in FIG. 4. In other words, the secondary collimation optics 33 are configured to substantially maintain unaltered or at most reduce the angular aperture α of the luminous intensity profile of the first highly collimated light component 24*a* and to substantially not modify the total flux thereof. For example, the secondary collimation optics 33 are configured to attenuate less than 10% of the total flux of the first highly collimated light component 24*a* exiting the first emission surface 25, preferably less than 5%, more preferably less than 2%.

Still, the secondary collimation optics 33 is configured to substantially not modify the correlated colour temperature CCT of the light components 24 with chromatic components having different angular distributions emitted by the first optical unit 20. At the exit from the second light-emitting surface 35, a weakly collimated light component 34*b* having a correlated colour temperature substantially equal to the second correlated colour temperature $CCT_2$ of the diffuse light component 24*b* of the light 24 emitted by the first optical unit 20 and a second highly collimated light component 34*a* having a correlated colour temperature substantially equal to the first correlated colour temperature $CCT_1$ of the first highly collimated light component 24*a* of the light 24 emitted by the first emission surface 25 are thus generated. The combination of these light components 34*a*, 34*b* forms the collimated light 34 with chromatic components having different angular distributions emitted by the second light-emitting surface 35 of the second optical unit 30.

In particular, the weakly collimated light component 34*b* is characterized by a luminous intensity profile with an angular aperture β greater than the angular aperture α' of the intensity profile of the second highly collimated light component 34*a*, wherein both intensity profiles are referred to the at least one half-plane section X of the dichroic separation optics 23.

For example, the angular aperture β of the weakly collimated light component 34*b* has a half width at half maximum (HWHM) 1.2 times greater, preferably 1.5 times greater, plus preferably 2 times greater than the half width at half maximum (HWHM) of the angular aperture α' of the intensity profile of the second highly collimated light component 34*a*.

In the embodiment of FIG. 1 and FIG. 2, the secondary collimation optics 33 are a structure comprising internally opaque walls positioned so as to reflect diffusely at least part of the diffuse light component 24*b* that is emitted at angles greater than the attenuation angle γ. To this end, the material of which these walls are composed has a diffuse reflectance equal to at least 50%, preferably at least 55%, more preferably at least 60%.

With reference to FIG. 3 a different embodiment of the lighting device 10 is illustrated schematically. In particular, the embodiment of FIG. 3 differs from the first embodiment in the implementation of the dichroic separation optics 23 and of the secondary collimation optics 33.

In the embodiment of FIG. 3, the dichroic separation optics 23 comprise a diffuse light generator 23*b*' of the active type. Further, the secondary collimation optics 33 are made as a reflector, thus comprising internally reflecting walls and configured so as to intercept and reflect at least part of the diffuse light component 24*b* and redistribute it so as to attenuate it for angles higher than the attenuation angle γ, measured with respect to the propagation direction A and equal to at least 2 times, preferably 2.5 times, more preferably 3 times, the angular aperture α of the luminous intensity profile of the first highly collimated light component 24*a*, with reference to the at least one half-plane section X. To this end, the material of which the internal walls are composed has a regular reflectance of at least 60%, preferably at least 65%, more preferably at least 70%. Furthermore, the secondary collimation optics 33 are configured such that they do not intercept the first highly collimated light component 24*a* of the light emitted by the first emission surface 25.

With reference to FIG. 4 another embodiment of the lighting device 10 according to the invention is schematically illustrated. In particular, the embodiment of FIG. 4 differs from the previous embodiments in the implementation of the secondary collimation optics 33.

In detail, in the embodiment of FIG. 4, the secondary collimation optics 33 are embodied as a refractive lens configured to interact with the diffuse light component 24*b* emitted by the first emission surface 25 of the first optical unit 20 so as to attenuate its luminous intensity for angles higher than the attenuation angle γ, with reference to the at least one half-plane section X. Thus, a weakly collimated light component 34*b* is generated downstream of the second emission surface 35 having an average value of the luminous intensity profile calculated for the angles comprised between the attenuation angle γ and 90°, which is less than the average value calculated over the same angular range of the luminous intensity profile of the diffuse light component 24*b*.

Furthermore, the secondary collimation optics 33 are configured to further collimate the first highly collimated light component 24*a* of the light emitted by the first emission surface 25, thereby obtaining downstream of the second emission surface 35 a second highly collimated light component 34*a* having a second angular aperture α' of the luminous intensity profile which is lower than the first angular aperture α of the luminous intensity profile of the first highly collimated light component 24*a* emitted by the first emission surface 25. In other words, the secondary collimation optics 33 are configured to generate the second highly collimated light component 34*a* starting from the first highly collimated light component 24*a* emitted by the first emission surface 25, keeping its total flux substantially unaltered and reducing the angular aperture of the luminous intensity profile in the reference half-plane.

Thus, at the exit of the second light-emitting surface 35 there are therefore the weakly collimated light component 34*b* with higher correlated colour temperature $CCT_2$ and the second highly collimated light component 34*a* with lower correlated colour temperature $CCT_1$—the latter being characterized by a second angular aperture α' of the luminous intensity profile which is lower than the first angular aperture α of the luminous intensity profile of the first highly collimated light component 24*a* exiting the first optical unit 20 and a total flux substantially equal to the flux of this first highly collimated light component 24*a*. The combination of these light components 34*a*,34*b* forms the collimated light 34 emitted by the second light-emitting surface 35 of the second optical unit 30.

With reference to FIG. 5 another embodiment of the lighting device 10 according to the invention is schematically illustrated. In particular, the embodiment of FIG. 5 differs from the other embodiments in that the dichroic separation optics 23 are made as a reflector 23*a* with the walls interacting with the incident light emitted by the primary light source 21—i.e. the internal reflecting walls—coated by a layer 23*b*" made of a chromatic diffusion material. The chromatic diffusion layer 23*b*" is, for example, applied by lamination if the material composing it is of the liquid crystal type. Alternatively, the layer is, for example, grown as an anodizing layer directly on the internal walls of the reflector 23*a*.

In this case, the light 22 emitted by the primary light source 21, incident on the internal walls of the reflector 23*a*, is partly collimated and partly diffused. In particular, a first spectral portion of the incident light crosses the chromatic scattering layer 23*b*" two times (incident beam and reflected beam) in a substantially unaltered manner, thus undergoing almost exclusively the collimation action caused by the reflector 23*a*. On the contrary, a second spectral portion of the incident light interacts significantly with the chromatic scattering layer 23*b*", which covers the internal walls of the reflector 23*a*, and is thus mainly scattered.

In this way, two chromatic components with different angular distributions exiting the dichroic separation optics 23 are generated: the first highly collimated light component 24*a* with lower colour correlated temperature $CCT_1$ and the diffuse light component 24*b* with higher colour correlated temperature $CCT_2$.

In order to ensure that almost all of the second spectral portion of the emitted primary light 22 interacts with the chromatic scattering layer 23*b*", thereby generating the diffuse light component 24*b*, the lighting device 10 may comprise a screen 27 positioned downstream of the primary light source 21 with respect to the propagation direction A so as to block a direct exit of the light emitted by the primary light source 21 through the first emission surface 25.

Figure 6:
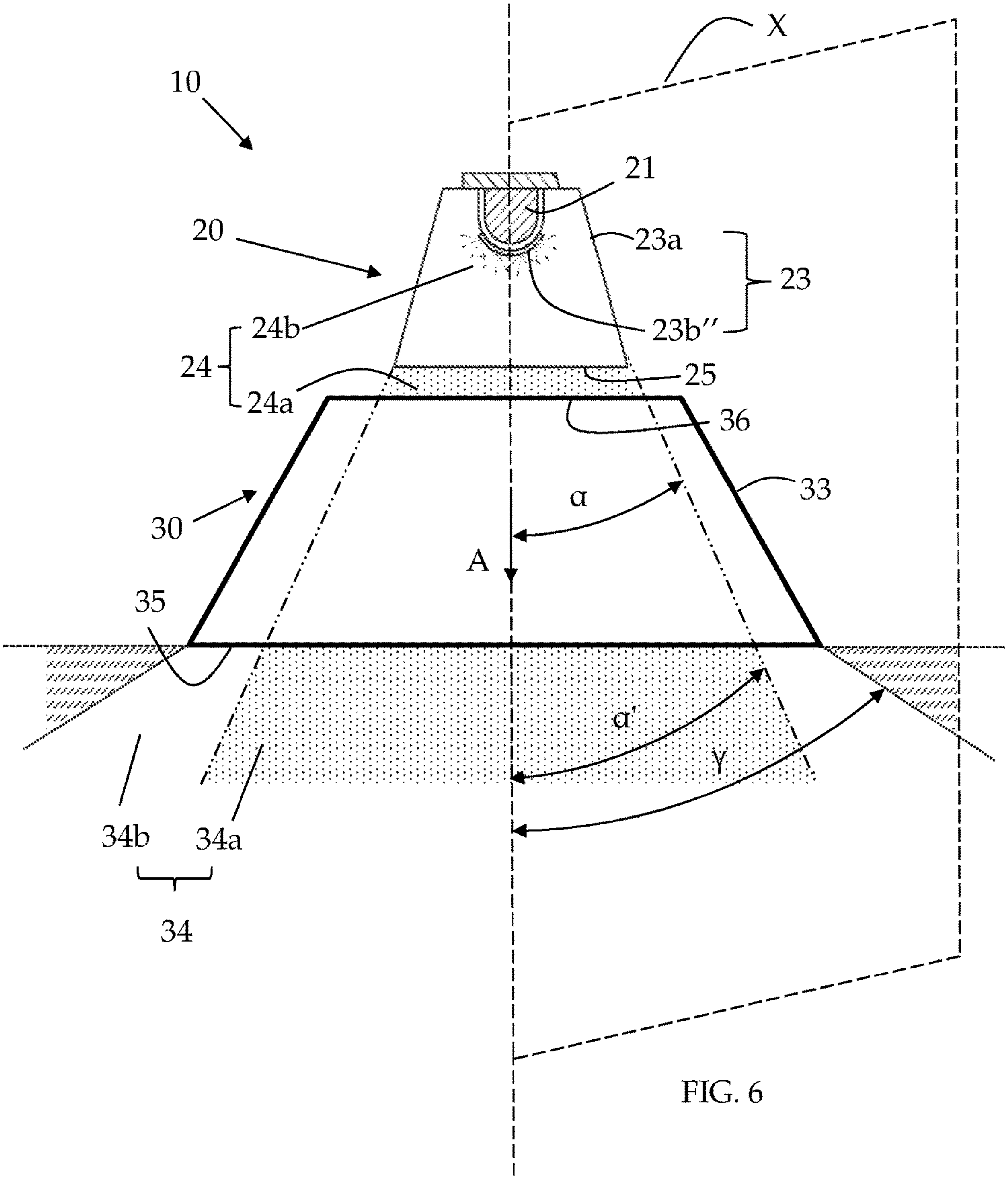
FIG. 6 is a schematic representation of a sixth embodiment of the lighting device to simulate natural lighting according to the present invention.

FIG. 6 shows a further embodiment of the lighting device 10 according to the invention in which the dichroic separation optics 23 are embodied as TIR lens with a portion of the light entry surface 26 coated with a chromatic scattering layer 23*b*".

In this case, the light 22 emitted by the primary light source 21, crossing the portion of the light entry surface 26, is partly collimated and partly diffused. In particular, a first spectral portion of the light crosses the portion of the light input surface 26—and so also the chromatic scattering layer 23*b*"—substantially unaltered, thereby undergoing the collimation action given by the lens 23*a*. A second spectral portion of the light incident on the chromatic scattering layer 23*b*", on the contrary, interacts significantly with the same, thus being mainly scattered.

This results in the generation of two chromatic components with different angular distributions exiting the dichroic separation optics 23: the first highly collimated light component 24*a* with lower colour correlated temperature $CCT_1$ and the diffuse light component 24*b* with higher colour correlated temperature $CCT_2$.

Furthermore, in the embodiment of FIG. 6 the secondary collimation optics 33 are made as a structure comprising internally absorbing (dark) walls, positioned so as to absorb at least part of the diffuse light component 24*b* emitted at angles greater than the attenuation angle γ, with reference to the at least one half-plane section X. To this end, the material of which said walls are composed has an absorption coefficient in the visible range of at least 70%, more preferably 80%, even more preferably 90% of the light incident upon it.

Figure 7:
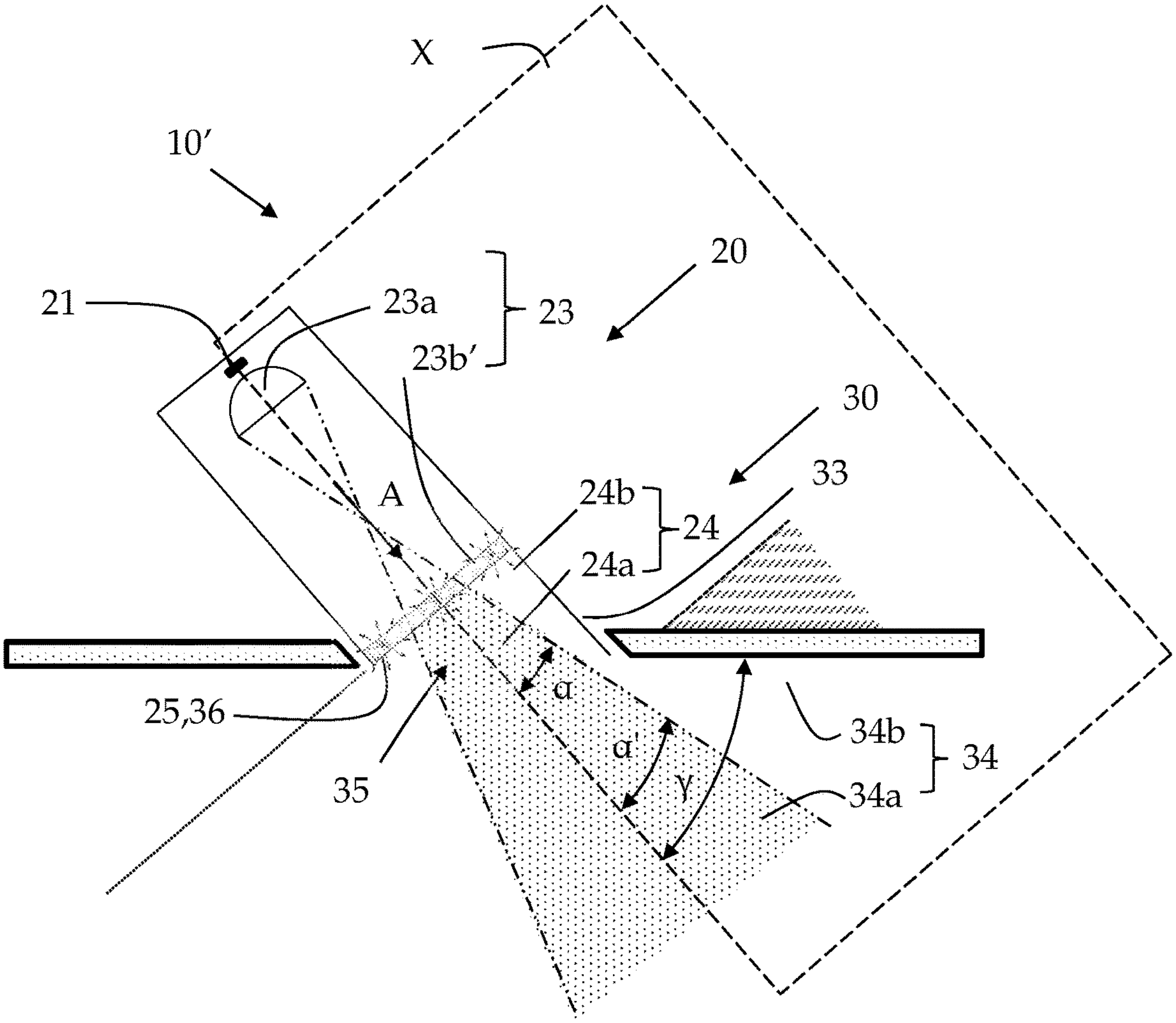
FIG. 7 is a schematic representation of a seventh embodiment of the lighting device to simulate natural lighting according to the present invention.

With reference to FIG. 7 a further embodiment of the lighting device 10' according to the invention is shown, presenting an elongated development, perpendicular to the plane of FIG. 7.

In detail, the first optical unit 20 of the device of FIG. 7 comprising a plurality of primary light sources 21 preferably arranged side by side and aligned along the elongated development of the device 10', and dichroic separation optics 23 comprising at least collimation optics 23*a*, associated with the plurality of primary light sources 21 and configured to collimate the light emitted by the plurality of primary light sources 21 around a plurality of parallel propagation directions A, each associated with and crossing a respective primary light source 21 of the plurality of primary light sources, so as to generate a first highly collimated light component 24*a* in at least a plurality of parallel half-plane sections X of the dichroic separation optics 23 each containing a propagation direction A of the plurality of parallel propagation directions, and a diffuse light generator 23*b*' configured to generate a diffuse light component 24*b* having a different, in particular higher, correlated colour temperature $CCT_2$ than a correlated colour temperature $CCT_1$ of the first highly collimated light component 24*a*.

The first highly collimated light component 24*a* generated by the dichroic separation optics 23 is characterized by a luminous intensity profile with an angular aperture α of less than 30°, preferably less than 20°, more preferably less than 15°, with reference to the at least one half-plane section X of the dichroic separation optics 23 containing the propagation direction A.

In view of the non-axial symmetry of the lighting device 10' with elongated development, it is to be considered that the first highly collimated light component 24*a* generated by the dichroic separation optics 23 has a luminous intensity profile with an angular aperture of less than or equal to 30° (20° or 15°, respectively) with respect to a subset of half-plane sections X of the dichroic separation optics 23 containing the propagation direction A, inclined to each other around the propagation direction A. In particular, the subset of half-plane sections X for which this condition is satisfied comprises half-planes that are inclined to each other within an angular range of at least 20°.

The second optical unit 30 of FIG. 7 comprises secondary collimation optics 33 made as a reflecting, opaque and/or absorbing screen positioned so as to intercept only the diffuse light component 24*b* of the light 24 emitted by the first optical unit 20. The action exerted by the secondary collimation optics 33 is to attenuate the luminous intensity of the diffuse light component 24*b* for angles higher than the attenuation angle γ in the at least one half-plane of section X of the dichroic separation optics 23. In this way, with reference to the particular installation of the lighting device 10' in FIG. 7 it is possible to reproduce a natural lighting effect, preventing the blueish diffuse light component 24*b* from being projected unnaturally onto the ceiling.

In addition, the secondary collimation optics 33 are configured so as to maintain substantially unaltered the first highly collimated light component 24*a* emitted by the first optical unit 20, substantially by not varying or at most reducing the angular aperture α of the luminous intensity profile and by not modifying the total flux.

Thus, a weakly collimated light component 34*b* and a second highly collimated light component 34*a* exiting the second light-emitting surface 35 are thus generated which form the collimated light 34 emitted by the second optical unit 30, thus exiting the lighting device 10' according to the invention. In particular, the highly collimated light component 34*a* exiting the second optical unit 30 has an angular aperture α' of the luminous intensity profile equal or less than the angular aperture α of the intensity profile of the first highly collimated light component 24*a* exiting the first optical unit 20 and the total flux substantially equal to that of this first highly collimated light component 24*a*.

In particular, the weakly collimated light component 34*b* is characterized by a luminous intensity profile with an angular aperture β greater than the angular aperture α' of the intensity profile of the second highly collimated light component 23*a*, wherein both intensity profiles are referred to the at least one half-plane section X of the dichroic separation optics 23.

Figure 8:
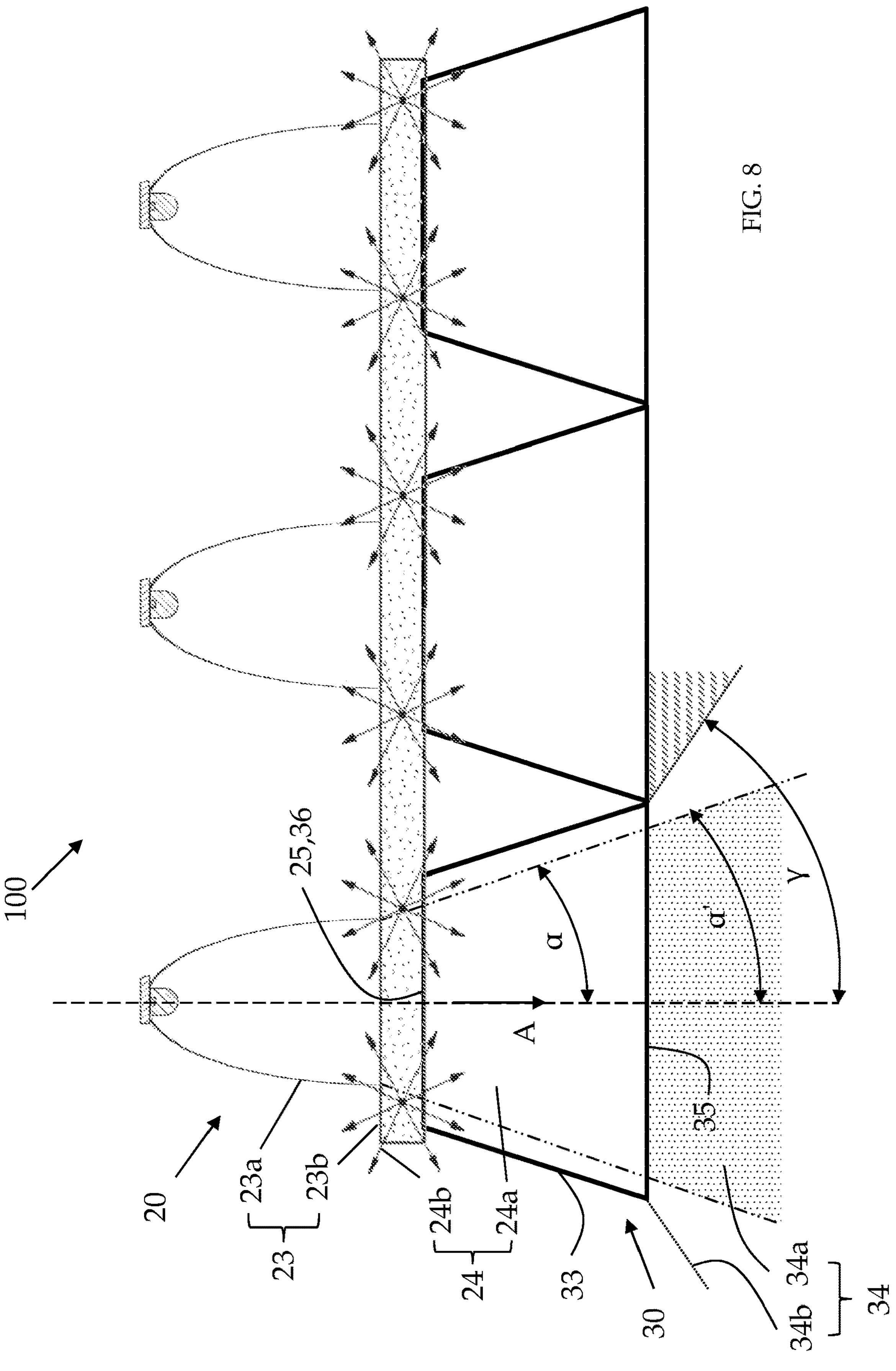
FIG. 8 is a schematic representation of an embodiment of a lighting system comprising a plurality of lighting devices to simulate natural lighting according to the present invention.

FIG. 8 shows a lighting system 100 to simulate natural lighting comprising a plurality of lighting devices 10 of the type illustrated in FIG. 2 wherein in particular the optical element for primary collimation 23*a* of the dichroic separation optics 23 has axial symmetry and wherein the lighting devices 10 are arranged so that the symmetry axes of the respective optical element for primary collimation 23*a* are arranged parallel to each other. Further, the lighting devices 10 are arranged in an extended structure on a plane perpendicular to each of the symmetry axes of the optical element for primary collimation 23*a*.

The invention thus conceived is susceptible to several modifications and variations, all falling within the scope of the inventive concept. For example, the secondary collimation optics 33 may be realised as a structure comprising partly absorbing and partly reflecting internal walls, or partly opaque and partly reflecting or again, partly opaque and partly absorbing, being in any case configured so as to absorb at least part of the diffuse light component 24*b* intercepted by the optics 33, and to reflect at least another part of the diffuse light component 24*b* intercepted by the optics 33, so as to attenuate the luminous intensity of the diffuse light component 24*b* for angles higher than the attenuation angle γ in the at least one half-plane section X.

In conclusion, all the details can be replaced with other technically-equivalent elements.

The invention claimed is:

1. A lighting device to simulate natural lighting, the lighting device comprising:

a first optical unit comprising a primary light source configured to emit primary light in the visible spectrum, and dichroic separation optics configured to intercept at least part of the primary light generated by the primary light source and emit, from a first emission surface, at least one first highly collimated light component having a propagation direction (A), and at least one diffuse light component, the at least one first highly collimated light component and the at least a diffuse light component forming a light with chromatic components having different angular distributions, wherein the at least one first highly collimated light component has a first correlated color temperature (CCT1), a total flux and a luminous intensity profile characterized by a first angular aperture (α) which is lower than 30° measured as half width at half maximum (HWHM) with reference to at least one half-plane section (X) of the dichroic separation optics containing the propagation direction (A), and wherein the at least one diffuse light component has a second correlated color temperature (CCT2) higher than the first correlated color temperature (CCT1) and a non-zero luminous intensity profile even for angles higher than 2 times the first angular aperture (α); and a second optical unit comprising secondary collimation optics configured to intercept at least part of the light with chromatic components having different angular distributions emitted by the first emission surface and generate, starting from this light with chromatic components having different angular distributions, a weakly collimated light component having a luminous intensity profile, referred to the half-plane section (X), characterized by an average value, calculated with reference to an attenuation angular range comprised between an attenuation angle (γ) and 90°, which is less than the average value of the luminous intensity profile of the at least one diffuse light component, calculated with respect to the same attenuation angular range, the attenuation angle (γ) being measured with respect to the propagation direction (A) and being equal to at least 2 times the first angular aperture (α) of the luminous intensity profile of the first highly collimated light component emitted by the first emission surface, and a second highly collimated light component having substantially the same total flux as the first highly collimated light component and a second luminous intensity profile angular aperture (α') which is equal or less than the first luminous intensity profile angular aperture (α) of the first highly collimated light component emitted by the first emission surface;

wherein the weakly collimated light component and the second highly collimated light component form a collimated light with chromatic components having different angular distributions emitted by the second optical unit.

2. The lighting device according to claim 1, wherein the secondary collimation optics are configured to generate a weakly collimated light component having a luminous intensity profile, referred to the half-plane section (X), characterized by an average value of less than 60%, of the average value of the luminous intensity profile of the at least one diffuse light component, calculated with reference to the attenuation angular range; and the secondary collimation optics are configured to substantially not intercept the highly collimated light component and/or not redistribute and/or not redirect the highly collimated light component outside of the first angular aperture (α).

3. The lighting device according to claim 1, in which the secondary collimation optics are made as optical reflecting optics configured to intercept and reflect at least part of the diffuse light component and redistribute it so as to generate a weakly collimated light component having a luminous intensity profile, referred to the half-plane section (X), characterized by an average value which is lower than the average value of the luminous intensity profile of the at least one diffuse light component calculated with respect to the attenuation angular range; and/or wherein the secondary collimation optics comprise a refractive lens configured to intercept and redirect at least part of the at least one diffuse light component and redistribute it to generate a weakly collimated light component having a luminous intensity profile, referred to the half-plane section (X), characterized by an average value which is lower than the average value of the luminous intensity profile of the at least one diffuse light component calculated with respect to the attenuation angular range;

wherein the secondary collimation optics comprise a structure comprising walls having at least a portion made of a material having a diffuse reflectance of at least 50%; and/or wherein the secondary collimation optics comprise a structure comprising walls having at least a portion made of a material having an absorption coefficient in the visible range equal to at least 70% of the incident light and positioned to intercept and absorb at least part of the diffuse light component emitted by the first emission surface at angles greater than the attenuation angle (γ).

4. The lighting device according to claim 1, wherein with reference to the half-plane section (X), an angular aperture (β) of the weakly collimated light component measured as half width at half maximum (HWHM) of the luminous intensity profile is at least 1.2 times greater than the first angular aperture (α) measured as half width at half maximum (HWHM) of the luminous intensity profile of the first highly collimated light component.

5. The lighting device according to claim 1, wherein the dichroic separation optics comprise an optical element for primary collimation configured to generate the highly collimated light component having a luminous intensity profile with the first angular aperture (α) starting from the primary light, and a diffuse light generator configured to generate the diffuse light component with the second correlated color temperature (CCT2).

6. The lighting device according to claim 5, wherein the diffuse light generator is a chromatic scattering element configured to be transparent to at least a first spectral portion of a light incident on the same and to scatter at least a second spectral portion of the incident light; and/or wherein the diffuse light generator is a chromatic scattering element of the tunable type configured to vary the scattering efficiency of the chromatic scattering element in at least the second spectral portion of the incident light; and/or wherein the diffuse light generator is a chromatic scattering element of the tunable type comprising a matrix made of polymeric material in which nanodroplets containing liquid crystals (LC) are trapped; and/or wherein the diffuse light generator is a chromatic scattering element shaped as a panel, a film, a surface coating layer or a surface anodizing layer; and/or wherein the diffuse light generator is a diffuse light generator of the active type.

7. The lighting device according to claim 6, wherein the chromatic scattering element is placed at the first emission surface or at least one surface of interaction between said primary light and said primary collimation element.

8. The lighting device according to claim 5, wherein at least the optical element for primary collimation of the dichroic separation optics has axial symmetry and the propagation direction is a symmetry axis of the optical element for primary collimation; and the diffuse light generator has a circular or quadrilateral section.

9. The lighting device according to claim 5, wherein the optical element for primary collimation of the dichroic separation optics has an elongated shape along a development axis of the device transverse to the propagation axis (A).

10. The lighting device according to claim 9, wherein the first optical unit comprises a plurality of primary light sources, and wherein the dichroic separation optics comprise at least one collimation lens associated with the plurality of primary light sources and configured to collimate the light emitted by each primary light source around a respective propagation direction (A) of a plurality of parallel propagation directions (A).

11. A lighting device comprising:
a primary light source configured to emit primary light;
a dichroic separation system configured to:
intercept at least part of the primary light, and
emit, from a first emission surface, light including a first chromatic light component having a first angular distribution and a second chromatic light component having a second angular distribution; and
a second optical unit configured to:
intercept at least a portion of the light emitted from the first emission surface, and
output collimated light including a first collimated light component having an angular aperture greater than an angular aperture of the first chromatic light component and less than an angular aperture of the second chromatic light component, and a second collimated light component having an angular aperture equal to or less than the angular aperture of the first chromatic light component.

12. The lighting device according to claim 11, wherein:
a color correlated color temperature of the second chromatic light component is greater than a color correlated color temperature of the first chromatic light component;
the first chromatic light component has an angular aperture, in terms of a half width at a half maximum, that is lower than 30°; and
the second chromatic light component propagates in substantially all possible directions.

13. The lighting device according to claim 11, wherein:
the first collimated light component is defined by a luminous intensity profile the average value of which is less than the average value of the luminous intensity profile of the second chromatic light component; and
the second collimated light component has substantially the same total flux as the first chromatic light component.

14. The lighting device according to claim 11, wherein:
the first collimated light component is defined by a luminous intensity profile having an attenuation angular range the average value of which is less than the average value of the luminous intensity profile of the second chromatic light component in the attenuation angular range; and
the second collimated light component has substantially the same total flux as the first chromatic light component.

15. The lighting device according to claim 11, wherein the second optical unit is configured to substantially not intercept the first chromatic light component and/or not redistribute and/or not redirect the first chromatic light component outside of the angular aperture of the first chromatic light component.

16. A lighting device comprising:
a primary light source configured to emit primary light;
a dichroic separation system in the path of the primary light, the dichroic separation system comprising:
a primary collimation system configured to generate, at a first emission surface, a first chromatic light component having a collimated angular distribution, and
a diffuse light system configured to generate, at the first emission surface, a second chromatic light component having a diffuse angular distribution; and
a secondary collimation system configured to:
intercept at least a portion of the light components emitted from the first emission surface, and
output collimated light including a first output light component having an angular aperture greater than an angular aperture of the first chromatic light component and less than an angular aperture of the second chromatic light component, and a second output light component having an angular aperture equal to or less than the angular aperture of the first chromatic light component.

17. The lighting device according to claim 16, wherein the secondary collimation system comprises one or more of: optical reflecting optics, a refractive lens, a structure comprising walls having at least a portion made of a material having a diffuse reflectance of at least 50%, and a structure comprising walls having at least a portion made of a material having an absorption coefficient in the visible range equal to at least 70%.

18. The lighting device according to claim 16, wherein the secondary collimation system is configured to substantially not intercept the first chromatic light component and/or not redistribute and/or not redirect the first chromatic light component outside of the angular aperture of the first chromatic light component.

19. The lighting device according to claim 16, wherein the diffuse light system comprises one or more of: a chromatic scattering element transparent to at least a first spectral portion of an incident light and configured to scatter at least a second spectral portion of the incident light, a tunable chromatic scattering element configured to tune its scattering efficiency in at least a spectral portion of the incident light, a tunable chromatic scattering element comprising a matrix made of polymeric material in which nanodroplets containing liquid crystals (LC) are trapped, a chromatic scattering element shaped as a panel, a film, a surface coating layer or a surface anodizing layer, and a diffuse light generator of the active type.

20. The lighting device according to claim 16, wherein the primary collimation system has axial symmetry and the diffuse light system has a circular or quadrilateral section.

21. The lighting device according to claim 16, wherein the primary collimation system has an elongated shape, and the primary light source includes a plurality of primary light sources, and
wherein the dichroic separation system comprises at least one collimation lens associated with the plurality of primary light sources and configured to collimate the light emitted by each primary light source around a respective propagation direction of a plurality of parallel propagation directions.

* * * * *